(12) United States Patent
Degler et al.

(10) Patent No.: US 7,905,337 B2
(45) Date of Patent: Mar. 15, 2011

(54) FORCE TRANSMISSION DEVICE

(75) Inventors: Mario Degler, Baden-Baden (DE); Stephan Maienschein, Baden-Baden (DE)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 632 days.

(21) Appl. No.: 11/973,608

(22) Filed: Oct. 9, 2007

(65) Prior Publication Data

US 2008/0083594 A1     Apr. 10, 2008

(30) Foreign Application Priority Data

Oct. 9, 2006   (DE) .......................... 10 2006 047 642

(51) Int. Cl.
*F16H 45/02* (2006.01)

(52) U.S. Cl. ................ 192/3.29; 192/70.17; 192/212; 60/338

(58) Field of Classification Search ............ 60/338
See application file for complete search history.

(56) References Cited

U.S. PATENT DOCUMENTS

| | | | |
|---|---|---|---|
| 6,273,226 B1 | 8/2001 | Hoenemann et al. | |
| 6,286,648 B1 * | 9/2001 | Matsuoka | 192/3.29 |
| 6,595,335 B2 * | 7/2003 | Schroder | 192/3.29 |
| 6,988,601 B2 * | 1/2006 | Schmid et al. | 192/3.29 |
| 2001/0008198 A1 * | 7/2001 | Maienschein et al. | 192/3.29 |

FOREIGN PATENT DOCUMENTS

DE          199 63 236 A1     7/2000

* cited by examiner

*Primary Examiner* — Richard M. Lorence
(74) *Attorney, Agent, or Firm* — Davidson, Davidson & Kappel, LLC

(57) ABSTRACT

A force transmission device including an input and an output, a hydrodynamic component, having at least one pump shell and one turbine shell, and a device for damping vibrations including a primary component and a secondary component, rotatable relative to each other in circumferential direction, wherein the secondary component is connected at least indirectly torque proof with the output, and the turbine shell is connected at least indirectly torque proof with the output.

The connection between the turbine shell and the output, or an element coupled torque proof with the output, is performed through the intermediary element connected with the turbine shell in a first coupling section and coupled in a second coupling section with the output, or with the element coupled torque proof with the output, wherein the intermediary element is characterized by a substantially constant wall thickness, and the two coupling areas are disposed offset relative to each other in axial and in radial direction.

14 Claims, 6 Drawing Sheets

US 7,905,337 B2

FORCE TRANSMISSION DEVICE

This claims benefit of German Patent Application 10 2006 047 642.5, filed Oct. 9, 2006.

The invention relates to a force transmission device.

BACKGROUND

Force transmission devices for motor vehicle applications, implemented as combined drive away- and lockup units, are known in a plurality of embodiments. In an exemplary manner, the patent document.

DE 199 63 236 A1 is referred to. This document comprises a hydrodynamic component in the form of a hydrodynamic speed-/torque converter, comprising a primary shell, functioning as pump shell, connected torque proof at least indirectly with the input of the force transmission device, and a secondary shell functioning as a turbine shell, which is at least indirectly connected with the output of the force transmission device. Furthermore, a device for bridging, and thus circumventing the power flow through the hydrodynamic component is provided. When embodied as a friction clutch, this comprises a first friction surface array, connected torque proof with the input, or the connection between the input and the pump shell, and a second friction surface array, which can be brought into operative engagement with the first one through an actuation device. Preferably a vibration damper is provided between the second friction surface array and the output. This damper comprises a primary section and a secondary section, which are disposed coaxial relative to each other, and which can be rotated relative to each other in circumferential direction within limits. Thus, the secondary component is connected torque proof at least indirectly with the output. Indirectly torque proof means that the coupling is performed either directly or through intermediary elements. The turbine shell of the hydrodynamic component is connected torque proof with the output hub. The coupling is performed here preferably through material continuity, wherein the connection between the output of the vibration damping device and the output hub can be performed either through form locked teething or swedging. A substantial problem of such embodiments is that for coupling to the output hub, the transition between the secondary shell or the turbine shell and the output hub has to be provided accordingly, which necessitates an accordingly shaped turbine shell, wherein the section that carries the blades is shortened in comparison in radial direction towards the inside, since the turbine shell does not have a torus shape in this section, but it is as straight as possible, or it has a particular shape for connecting to the drive hub. This leads to relatively large gaps at the transition between the turbine shell and the stator shell. In hydrodynamic operation, this means with hydrodynamic power transfer between pump- and turbine shell through the stator shell, this can lead to substantial fluid dynamic losses, which are undesirable for operation, and which have to be compensated through a different layout of the hydrodynamic components, or other measures. This necessitates an increased design and possibly also control complexity.

SUMMARY OF THE INVENTION

An object of the invention is to refine a force transfer device. Thus, in particular a design of the coupling between the turbine shell and the output of the power transfer device should be emphasized, in which the width of the gap between the stator shell and the turbine shell at the transition between the turbine shell and the stator shell is kept as small as possible. A solution according to the invention may thus be characterized by a small engineering and manufacturing effort.

An embodiment of the invention provides a force transfer device including an input and an output, a hydrodynamic component with at least one pump shell and a turbine shell and a device for damping vibrations with a primary component and a secondary component, disposed in parallel to the hydrodynamic component, wherein the primary component and the secondary component can be rotated relative to each other within limits, wherein the secondary component and the turbine shell are connected at least indirectly, respectively torque proof with the output. According to the invention an intermediary element is disposed torque proof between the turbine shell and the primary component. Thus, the connection between the turbine shell and the output, or an element coupled torque proof with the output is performed through an intermediary element, wherein the intermediary element has a first coupling section for torque proof coupling with the turbine shell, and a second coupling section for torque proof coupling with the output, or with an element coupled with the output at least indirectly torque proof, and the two coupling sections are disposed offset from each other in axial and in radial direction. At least indirectly means that the coupling can be performed either directly, or through torque transferring intermediary elements or units.

According to a particularly advantageous embodiment, the intermediary element may be provided with approximately constant wall thickness over its axial extension, seen in installed position. Through the shape of the intermediary element, and through the radial and axial offset, also more extreme coupling situations can be compensated through a relatively thin element.

One advantage of the invention is that the intermediary element can be adapted in an optimum manner to the structural conditions in the section of the interior circumference of the hydrodynamic component and of the units disposed adjacent to it in axial direction, as for example a vibration damper, in a simple manner. The gap between the turbine shell and the stator shell can thus be minimized, since no consideration has to be given with respect to the design of the turbine shell and with respect to the coupling planes with the connection elements. This may improves the flow cycle in the operating volume of the hydrodynamic component and reduces the hydrodynamic losses at transition between the stator shell and the turbine shell.

Typically, the first coupling section in radial direction will be disposed on a larger diameter in installed position. The joining surface at the turbine shell can thus be disposed as close as possible to the outer circumference, or the inner circumference of the turbine shell, so that the required modifications with respect to the coupling with the connection elements at the turbine shell itself are relatively small, and no complicated manufacturing processes are required.

In order to allow an optimum adaptation with respect to geometry with low manufacturing complexity, the intermediary element is preferably provided as annular or hollow cylindrical shaped sheet metal part. Furthermore, conceivable embodiments may be made from plastic. The intermediary element is then characterized, seen in cross section, preferably through an S- or Z-shaped profile.

With respect to aligning the joining sections and the characterizing flange surfaces at the intermediary element, or the connection elements, there are several possibilities. In the simplest case, they may be aligned in parallel to each other, or at an angle, wherein in this case a tangential connection of the intermediary element to the turbine shell becomes possible directly at the outer circumference, this means an additional flange at the turbine shell, in particular at the turbine shell dish, may not be necessary.

The connection of the second coupling section may be performed through an element, which is coupled at least indirectly torque proof with the output. This can be formed by an element of the device for damping vibrations, preferably the primary component, so that the effect of the damper in the hydrodynamic power train may be performed subsequently. The element coupled torque proof with the output can further be formed by an output hub, which is connected torque proof with the output, and which furthermore also carries the secondary component of the device for damping vibrations.

With reference to the connection, selected in the two joining sections, there is a plurality of possibilities. These can be provided as materially continuous, friction locked and/or form locked connections, wherein different solutions are conceivable for the particular joining sections, and also within one joining section.

BRIEF DESCRIPTION OF THE DRAWINGS

The invention is subsequently described with reference to the figures. Therein the following is shown in particular.

DETAILED DESCRIPTION

Figure 1:
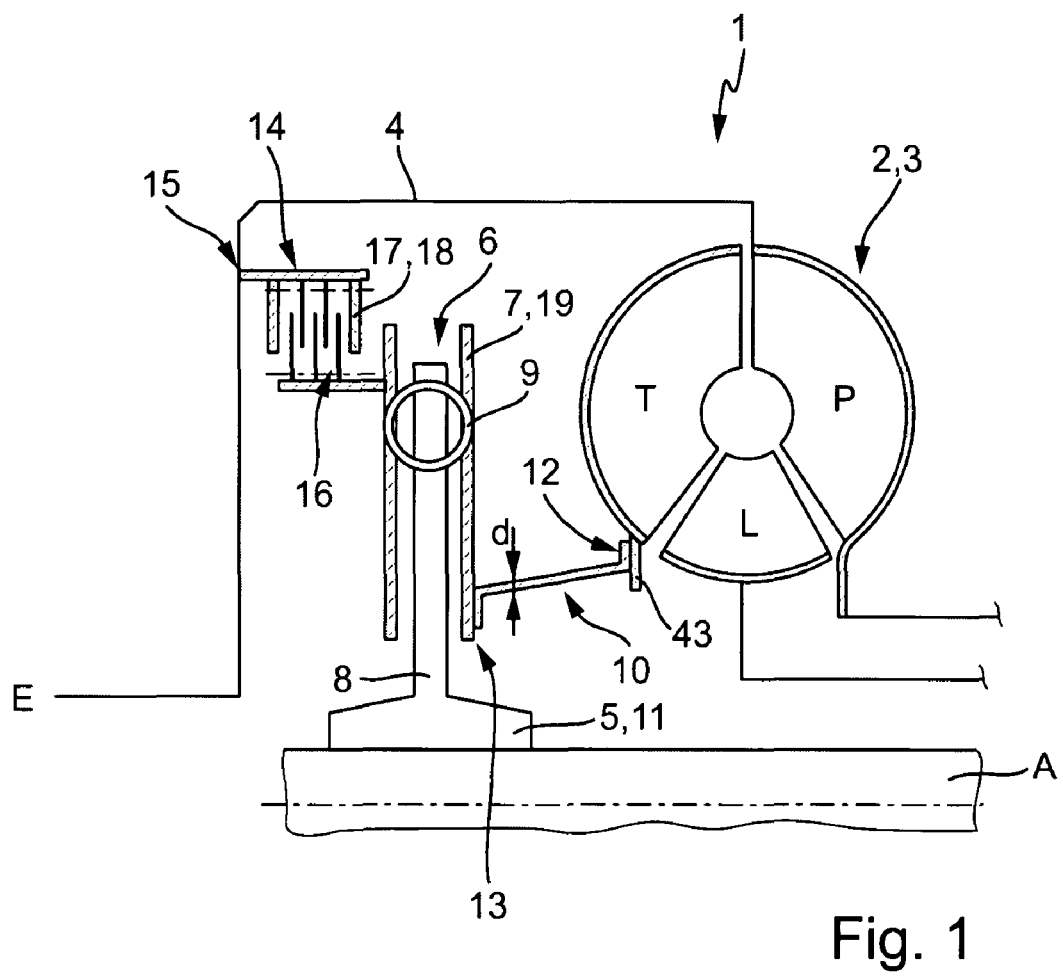
FIG. 1 illustrates the design of a force transmission device with the coupling between the turbine shell and the output according to the invention with reference to an axial sectional view in a simplified schematic depiction.

FIG. 1 illustrates the layout of a force transmission device 1 in a simplified schematic depiction with a coupling according to the invention between a turbine shell T and a hydrodynamic component 2 in the form of a hydrodynamic speed-/torque converter 3. Torque converter 3 further comprises a pump shell P and at least one stator shell L. The force transmission device 1 comprises an input E and an output A, wherein the pump shell P of the hydrodynamic speed-/torque converter 3 is connected at least indirectly torque proof with the input E. The connection is performed either in a shift able manner through a pump shell clutch or in a non shift able manner. In the latter case, the connection with the input E is performed torque proof through respective housing parts, preferably a housing shell 4. The turbine shell T is coupled at least indirectly, this means directly or through intermediary elements, torque proof with the output A. The output A is thus typically formed by the transmission input shaft in an embodiment, where it is disposed in front of the force transmission device 1. The coupling with the output A is typically performed at least through a component 11, connected torque proof with the output, and provided as a output hub 5. The connection can be performed directly with the output hub 5 or through additional elements integrated in the force transmission device 1, provided as a device 6 for damping vibrations, in particular a torsion vibration damper. Torsion vibration damper 6 can be provided in different embodiments, however, it comprises at least a primary component 7, which is also designated as input component, and a secondary component 8, which is designated as output component, and which is also connected torque proof with the output A, either directly, or for example. through the output hub 5. The primary component 7 and the secondary component 8 are disposed coaxial with each other, rotatable within limits relative to each other in circumferential direction, and coupled amongst each other through coupling device 9 for spring- and/or damping coupling. The particular embodiment thus depends on the particular case. Conceivable are for example, devices for damping vibrations with only mechanical damping, this means friction damping, and also hydraulic damping devices. The turbine shell T can be coupled with the primary component 7 of the device 6 for damping vibrations, so that during power transmission from the input E to the output A through the hydrodynamic speed-/torque converter 3, the device 6 for damping vibrations, subsequent to the hydrodynamic component 2, is always effective. In case the connection is performed directly to the output component, this means to the secondary component 8, or to the output shaft 5, the device 6 for damping vibrations during power transmission through the hydrodynamic component is not integrated in the power flow between the hydrodynamic component 2 and the output A. In the illustrated case the coupling is performed with the input-, or the primary component 7. The coupling is performed according to the invention through an intermediary element 10, which is coupled torque proof with the turbine shell T, and an element of the device 6 for damping vibrations, or with an element 19 that is coupled at least indirectly torque proof to the output A. The element 19, which can be coupled torque proof with the output A, can be formed either by the secondary component 8, by the primary component 7, by an element of the device 6 for damping vibrations, and by the drive hub 5, or by another connection element between the device 6 for damping vibrations and the element A in the power flow. In the illustrated embodiment, the element 19 is formed by the primary component 7. The intermediary element 10 is thus characterized by two coupling sections, a first coupling section 12 and a second coupling section 13. The two coupling sections 12, 13 are disposed offset from each other in radial direction for optimum use of the available installation dimensions, and furthermore also disposed with axial offset. This causes the formation of the intermediary element 10 as a shaped component. It is preferably provided with a substantially constant wall thickness d over its entire extension in axial, or in radial direction. The shape in cross section describes substantially an S-, or also a Z shape, this means a shaped part with at least two sections oriented in opposite direction.

A common area of application of such couplings between a turbine shell T and a device 6 for damping vibrations are force transmission devices 1, additionally including a device 14 for circumventing the hydrodynamic power flow. This device thus quasi functions as a lockup clutch, wherein said lockup clutch can also be operated with a slippage, and through the slipping operation also partially an overlap between hydrodynamic and mechanical power transmission would be possible. The device 14, in particular the lockup clutch, comprises at least a first friction surface array 15, which is connected at least indirectly torque proof with the input E of the power transmission device 1, and a second friction surface array 16, which is provided through an actuation device 17, which is provided as a piston element 18 in the simplest embodiment and can be brought into operating engagement with the first friction surface array 15. The piston element 18 can thus be supported for example at the input E, or at an element coupled torque proof therewith, wherein the piston element is coupled torque proof with a connection between the input E and pump shell P, and movable in axial direction, relative to it, or the piston element is coupled torque proof, as illustrated, with the output A through the device 6, and movable relative to it in axial direction. The actual embodiment with reference to the actuation device 17, the device 14, and the device 6 for damping vibrations depends on the particular application and is therefore not addressed in detail here. Furthermore, the force transmission device 1 can be provided as a three channel system, or as a two channel system, depending on the question, if a separate operating pressure for the actuation device 17 is desired, or a dependency between the actuation of the actuation device 17 and the pressure in the hydrodynamic component 2 exists.

Figure 2:
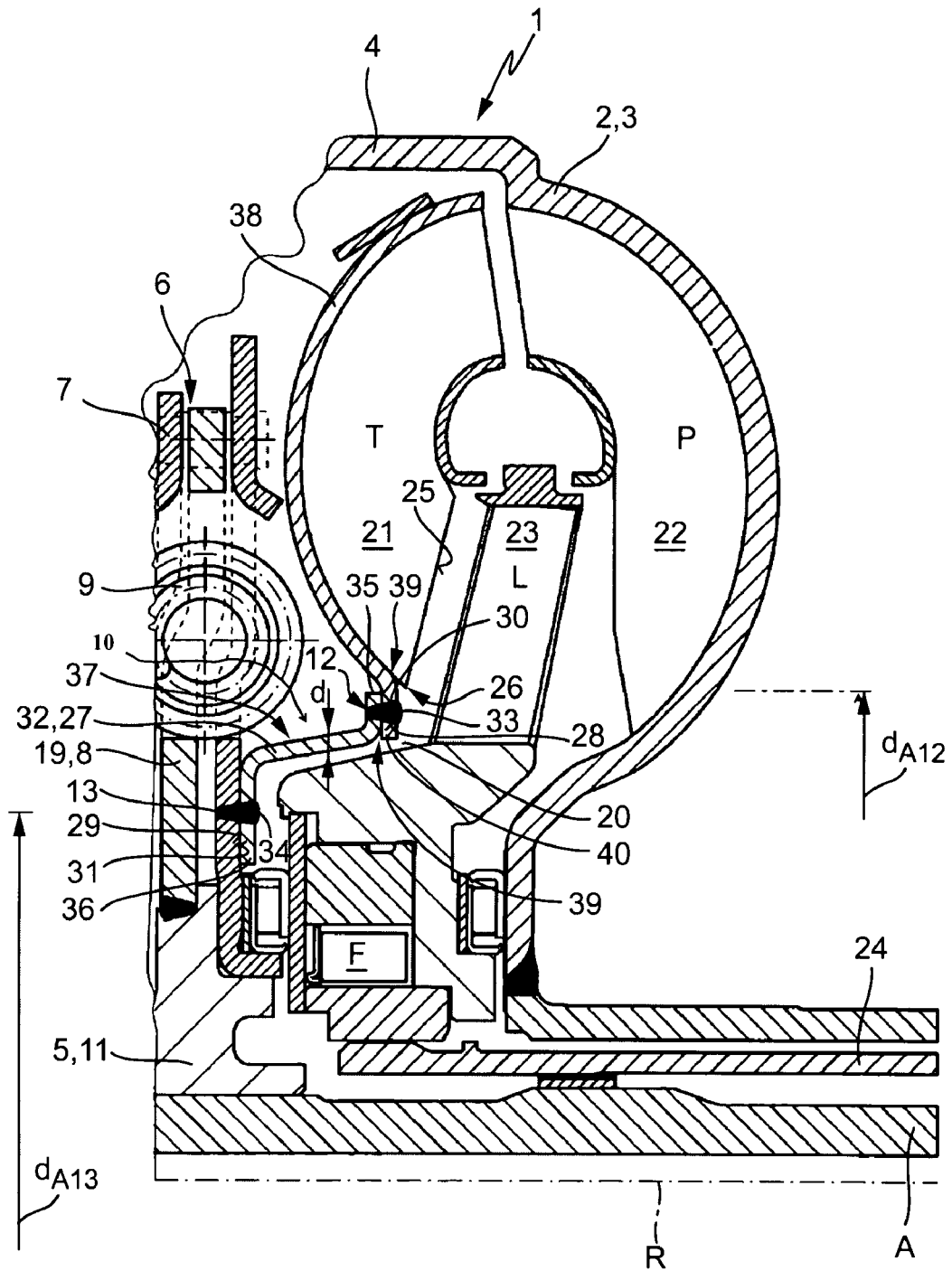
FIG. 2 illustrates a first embodiment with continuous material connection with reference to a detail view according to FIG. 1.

FIG. 2 illustrates the embodiment according to the invention, and the connection of the intermediary element 10 for coupling, based on a detail view, in particular, a torque proof coupling between the turbine shell T and the element 19, coupled at least indirectly torque proof with the output A. The element 19, in this embodiment provided as an element of the device 6, for damping vibrations, in particular the input or the primary component 7. The advantage of the solution according to the invention is that it holds the gap 20 between the turbine shell T and the stator shell L as small as possible. This facilitates the routing of the flow medium and reduces the hydrodynamic losses. The gap 20 between the blade assembly 21 is visible, in particular between the blade tips 25 at the transition 26 to the stator shell L. In order to be able to pull it as far as possible in the direction of the stator shell L, in particular to the blades 23 of the stator shell L and thereby provide it in a small size, the intermediary element 10 is formed accordingly. It is provided as an annular element 27 in the illustrated case, having a Z- or S-shaped profile seen in cross section, and two coupling sections 12, 13. The coupling sections 12 and 13 for coupling, in particular for torque proof connection with the connection elements turbine shell T, and the element 11, coupled torque proof with output A, or the element 19 coupled therewith at least indirectly, in this case, the primary component 7 of the device 6 for damping vibrations, are thus provided, so that they form preferably a joining surface each in the form of a flange surface 28 or 29, which come in contact with respective complimentary flange surfaces 30 and 31 at the connection elements turbine shell T and primary section 7, wherein the connection is performed in the contact area. The intermediary element 10 is thus preferably provided as a shaped sheet metal body 32. It is also feasible to produce this body from other materials, selected according to the loads. The use of fiber composite materials, but also of plastic materials is feasible. The wall thickness d of the intermediary element 10 is thereby preferably provided with approximately the same thickness over its entire extension in axial direction.

In the embodiment shown in FIG. 2, the flange surfaces 28 at the first coupling section 12 and the flange surface 30 function as joining surfaces, at which the connection between the intermediary element 10 and the turbine shell T is performed in the first coupling section 12. Analogously, this also applies to the flange surface 29, formed at the intermediary element 10, wherein the flange surface 29 defines a joining section with a surface 31 at the element 19, coupled torque proof with the output A, facing towards it. In the embodiment shown, the torque proof connection is performed through material continuity, this means it cannot be disengaged, it is performed in particular through a respective weld, in this case for the coupling between the turbine shell T and the intermediary element 10, designated with 33, and for the connection between the intermediary element 10 and the element 19 of the device 6 for damping vibrations, coupled torque proof with the output A, designated as 34. The joining areas defining the connection of the particular coupling areas 12, 13 with the connection elements are offset from each other in axial direction, and offset from each other in radial direction, wherein the first coupling section 12 and thus also the first joining section is disposed in radial direction on a larger diameter $d_{A12}$, than the second coupling section $d_{A13}$. The surface areas defining the joining surfaces at the particular elements to be connected amongst each other, and thus the joining sections are disposed here in parallel to each other. The intermediary element 10 is formed accordingly. The intermediary element 10, in this case, therefore comprises three sections, a first section 35, which serves for abutment of the flange surface 28 at a complementary flange surface 30 on the turbine shell. A second section 36 serves for providing a flange surface 29 for connection with a complementary flange surface 31 at an element 19, coupled torque proof with the output A. The third section 37 connects the two sections 35 and 36 amongst each other. This section thus serves as a compensation area for the radial offset of the two coupling sections 12 and 13. In the shown embodiment, the intermediary element 10 is provided with a minimal gap 20 towards the stator shell L, wherein through the particular shape of the intermediary element 10 an optimum adaptation to the particular application, in particular to the shape of the other elements, for example, to the stator shell L, and to the elements coupled therewith torque proof, is performed. The intermediary 10 can thus extend in a space saving manner, making optimum use of the intermediary space between the device 6 for damping vibrations and the turbine shell T of the hydrodynamic speed-/torque converter 3, and the connection can be established without collision due to being able to choose any shape. Thus, the connections in the coupling areas 12 and 13 for the torques to be transferred need to be designed and sized accordingly, this means the design of the connection in the coupling sections 12 and 13 has to be performed according to the loads.

In order to be able to form the flange surface 30 at the turbine shell T accordingly, the turbine shell 38, which carries the blading 21, is provided accordingly in the end section 39, facing the stator shell L in installed position. In the illustrated case, the turbine shell 38 has an annular flange 40. It extends in an annular manner in circumferential direction forming the axially oriented flange surface 30, and faces the rotation axis R in radial direction, wherein the flange surface 30 created by it extends orthogonal to the rotation axis R.

In the axial sectional view of the detail according to FIG. 1, in FIG. 2, the blading 22 of the pump shell P and the blading 23 of the stator shell L are visible additionally. The stator shell L is thus supported through a support shaft 24 on the output A. Other connections are also conceivable. With respect to the actual support and possible insertion of free wheeling clutches F, there are no restrictions. Furthermore, it also conceivable to support the stator shell L fixated in place. In the shown embodiment, the coupling is performed through a free wheeling clutch F.

Figure 3:
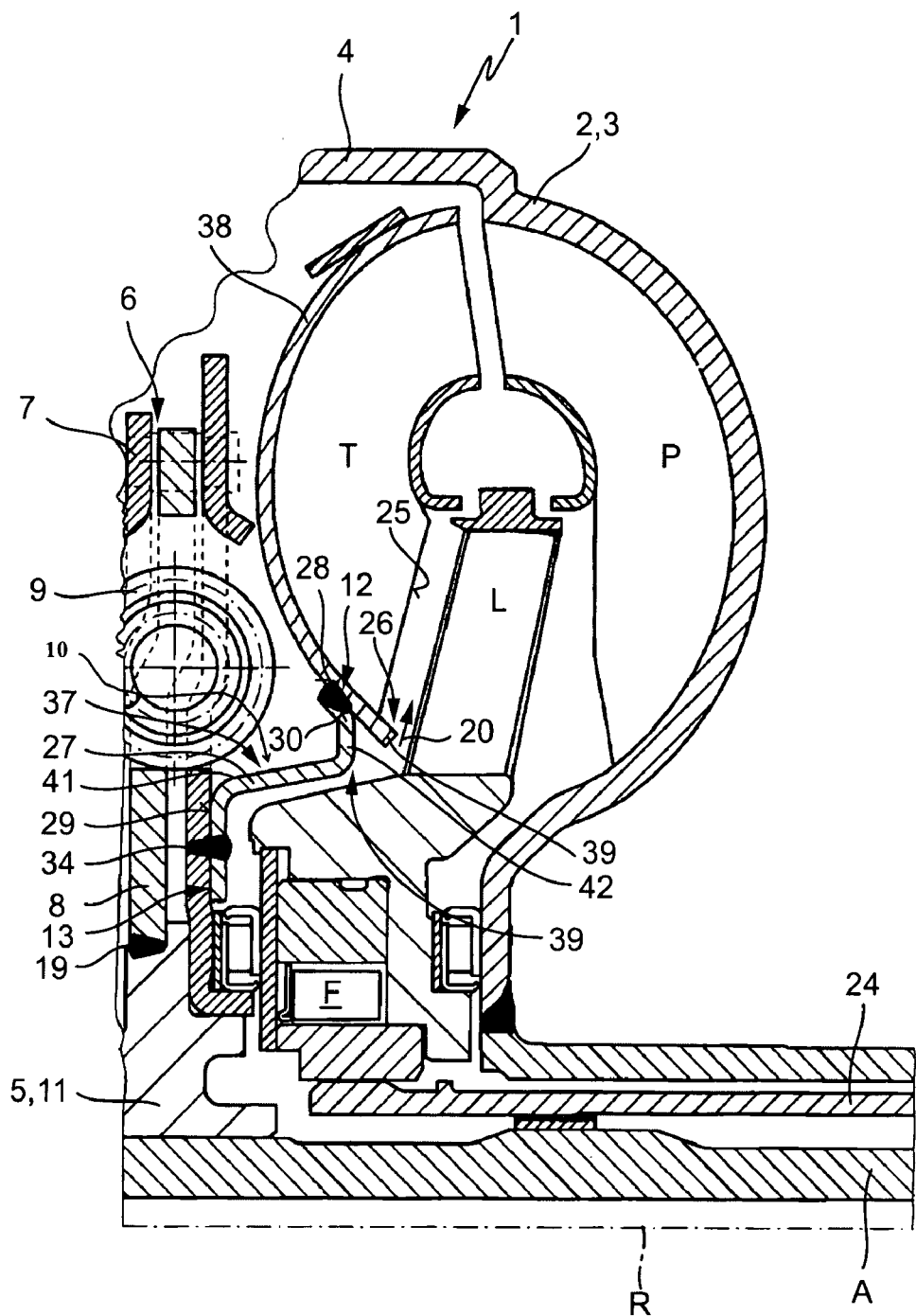
FIG. 3 illustrates a second embodiment with continuous material connection based on a detail view according to FIG. 1.

FIG. 2 illustrates an embodiment with two joining sections disposed in parallel to each other at the coupling sections 12 and 13, FIG. 3 shows an embodiment with joining sections disposed at an angle relative to each other, based on a cutout from an axial sectional view of a detail according to FIG. 1. The coupling section 13 at the intermediary element 10, and thus the joining section formed with the primary component 12, are formed analogous to FIG. 2. The flange surfaces 29 and 31 are formed in a respective complementary manner at the elements to be coupled, with the coupling section 13 provided at the intermediary element 10 and at the primary component 12. The connection is performed through a weld. The weld is designated as 34 in analogy to FIG. 2. The connection of the intermediary element 10 with the turbine shell T in the first coupling section 12 is thus performed in a tangential manner. For this purpose the flange section forming the abutment surface, or the flange surface 28 is provided inclined relative to a parallel of the flange surface 29. The third section 37 by comparison is characterized through two partial sections 41 and 42, wherein the shape of the partial section 41 corresponds to the one in FIG. 2, and additionally, the second partial section 42 follows accordingly in order to compensate a radial offset. In order to further reduce the gap 20 according to an advantageous embodiment, the end section of the turbine shell T, in particular in the section of the transition 26 between the turbine shell T and the stator shell L, extends further into the stator shell, according to a refinement of FIG. 3 in FIG. 4, wherein the stator shell L has a respective cutout 47 in this case. The section of the turbine shell extending into the section of the stator shell L is designated with 48. Otherwise, the layout corresponds to the one described in FIGS. 1 through 3. Therefore, the connection of the intermediary element 10 in the two coupling sections 12 and 13 is not addressed in more detail. Also here the connections in both joining areas are created through welds 33 and 34.

Figure 4:
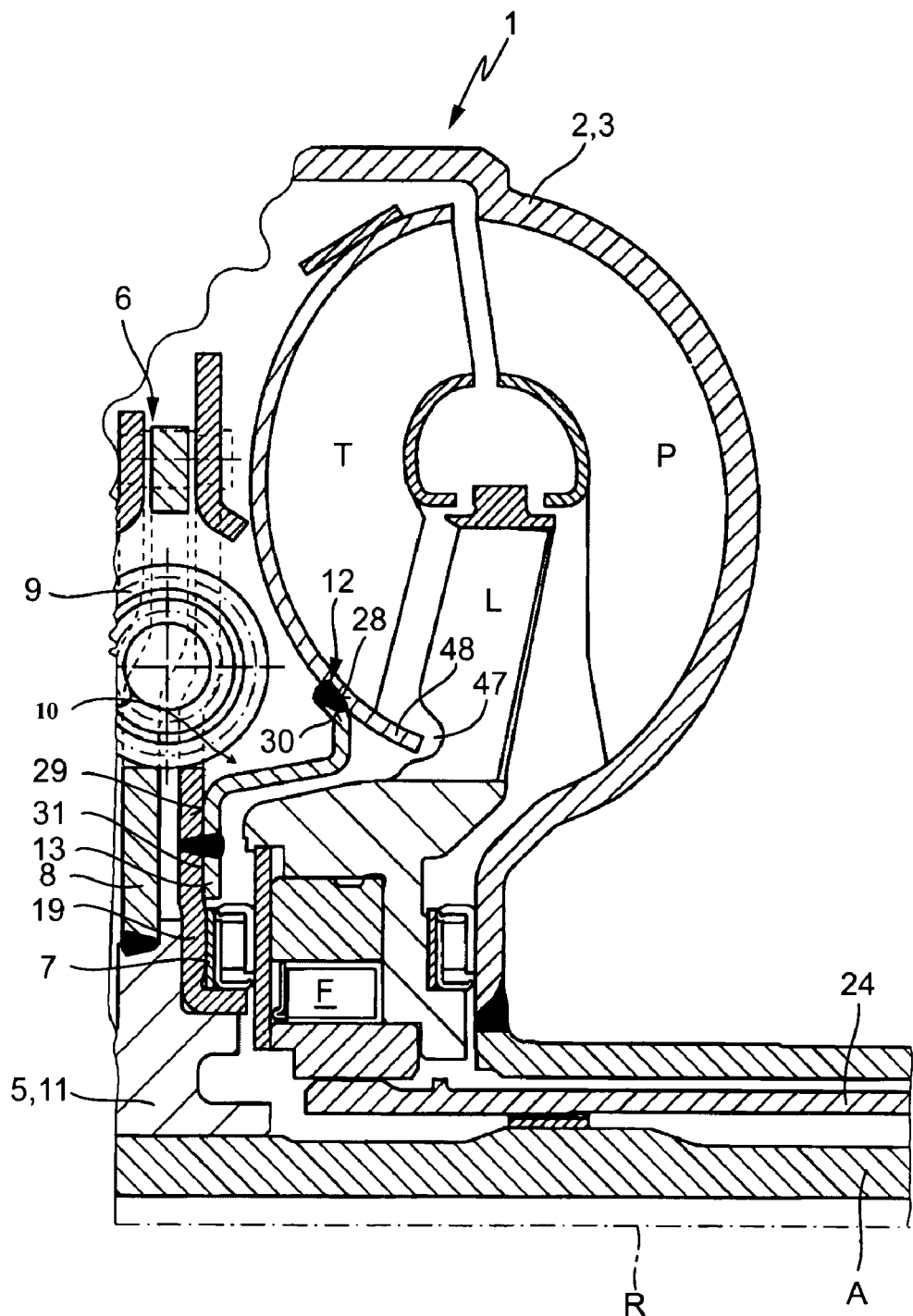
FIG. 4 illustrates a third embodiment of a continuous material connection with reference to a detail view according to FIG. 1.
Figure 5:
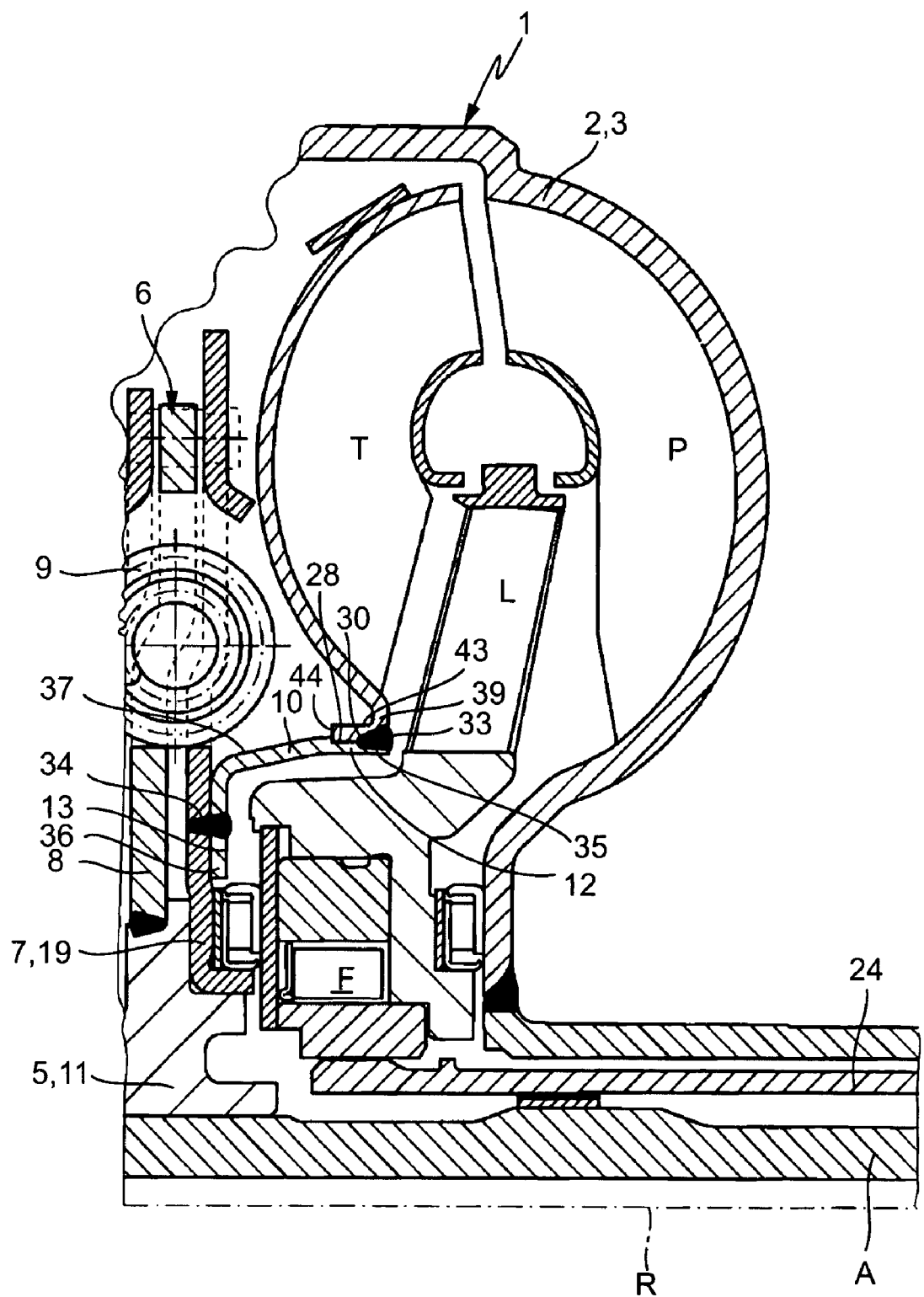
FIG. 5 illustrates a fourth embodiment with continuous material connection with reference to detail view according to FIG. 1.

FIG. 5, on the other hand, also illustrates with reference to a cutout from an axial section in analogy to the FIGS. 2 through 4, a refinement through forming the coupling sections 12 and 13 at the intermediary element perpendicular to each other, and thus also the surfaces of the joining sections, in particular the joining surfaces. The connection of the second coupling section 13 is shaped in analogy to the ones described in FIGS. 2 through 4, and therefore this is not addressed again in detail. Also, the connection of the first coupling section 12 is performed through material continuity. The joining surfaces, however, are aligned perpendicular to the joining surfaces of the connection between the second coupling section 13 and the output hub 5. Also, here they form flange surfaces 28 and 30. They are provided in the illustrated embodiment in parallel to the rotation axis R of the hydrodynamic component 2. The intermediary element 10 can thus be divided into three sections, also here a first section 35 for coupling in the first coupling section 12, a second section 36 for coupling with the second coupling section, and a third section 37 connecting the two amongst each other. The required flange surface 30 at the hydrodynamic speed-/torque converter 3 is also realized here through a collar 43, wherein the collar 43 however is provided here, so that it also has an axially oriented section 44, besides an extension in radial direction. The collar 43 forms a radial flange here.

Figure 6:
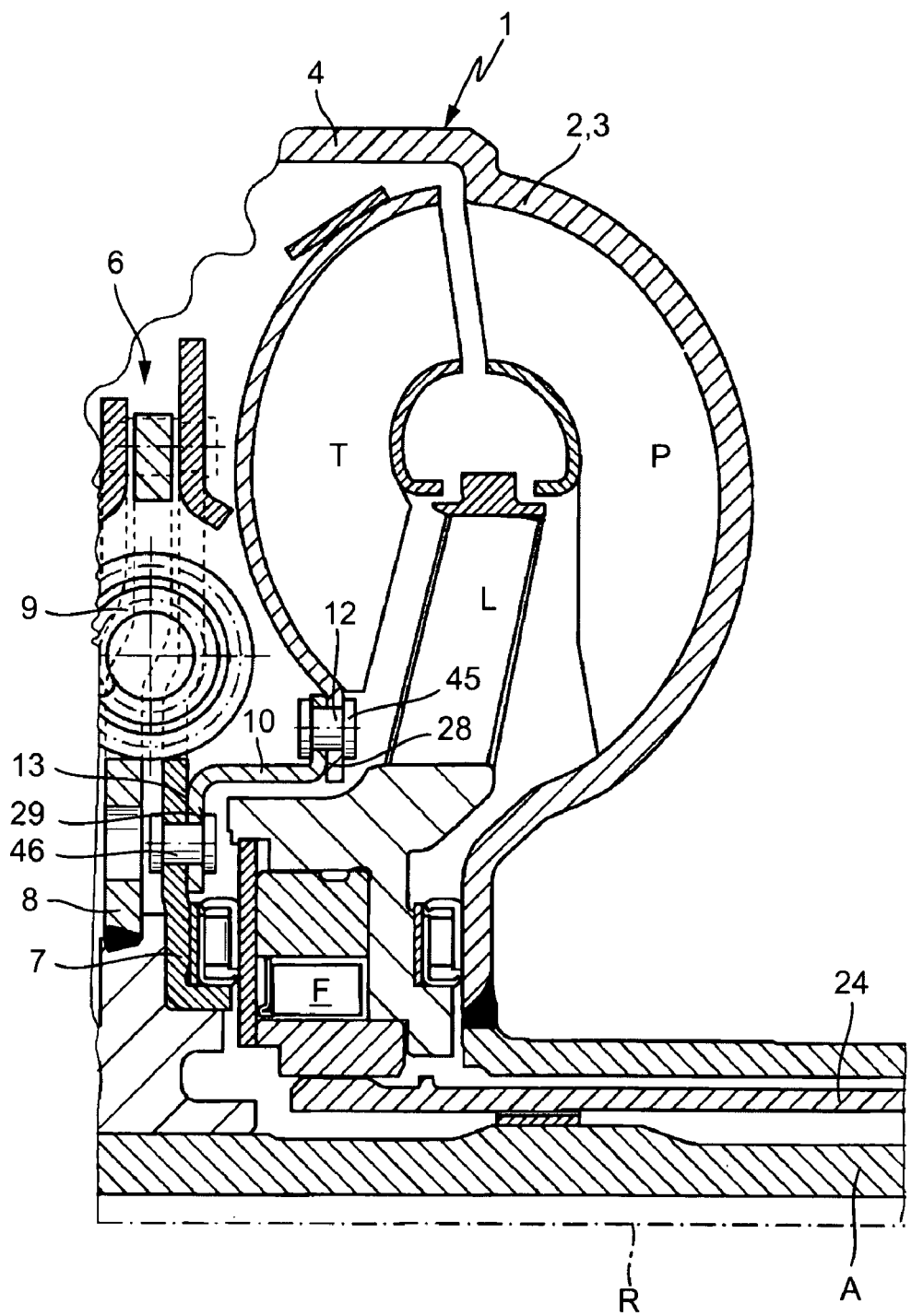
FIG. 6 illustrates a first embodiment with friction locked connection in both coupling sections with reference to a detail from an axial sectional view according to FIG. 1.

The FIGS. 2 through 5 illustrate embodiments of the connections in the coupling sections 12 and 13 through continuous material connection in the form of welds 33 and 34, and thereby a connection that can not be disengaged, wherein these are formed circumferential, or through forming circumferentially spaced particular point welds. FIG. 6 on the other hand illustrates a friction locked connection through riveting at both coupling sections 12 and 13. The layout of the intermediary element 10 corresponds to the one described in FIG. 2. As connection elements 45 and 46, rivets are provided for the two respective coupling sections 12, 13. These can be provided in respective equal distances in circumferential direction. Each coupling section 12, 13 for example, extends in an annular manner in circumferential direction with axially oriented flange sections as joining surfaces, or flange surfaces 28 and 29.

The types of connections of the intermediary element 10 with the connection elements shown in the FIGS. 2 through 6 are examples. Other possibilities, as for example swedging, or a connection with teeth, etc., are conceivable. It is important that the connection of the turbine shell T is performed torque proof with the output A, however not directly, but through the intermediary element 10 at two coupling locations, which are realized through the coupling sections 12, 13.

DESIGNATIONS 1 force transmission device
2 hydrodynamic component
3 hydrodynamic speed-/torque converter
4 housing shell
5 output hub
6 device for damping vibrations
7 primary component
8 secondary component
9 means for spring- and/or damping coupling
10 intermediary element
11 element coupled torque proof with the output
12 first coupling section
13 second coupling section
14 device for circumventing the hydrodynamic power train
15 first friction surface array
16 second friction surface array
17 actuation device
18 piston unit
19 element coupled at least indirectly torque proof with the output
20 gap
21 blading
22 blading
23 blading
24 support shaft
25 blade tip
26 transition
27 annular element
28 flange surface
29 flange surface
30 flange surface
31 flange surface
32 shaped sheet metal body
33 weld
34 weld
35 first section
36 second section
37 third section
38 turbine shell
39 end section
40 collar
41 first section
42 second section
43 collar
44 section
45 rivet
46 rivet
47 cutout
48 component
d wall thickness
T turbine shell P pump shell
L stator shell
E input
A output

What is claimed is:

1. A force transmission device comprising:
an input;
an output;
a hydrodynamic component having at least one pump shell and one turbine shell;
a damper for damping vibrations, the damper including a primary component and a secondary component rotatable relative to each other in a circumferential direction, the secondary component being non-rotatably connected to the output and the turbine shell being non-rotatably connected to the primary component with an intermediary element being disposed between the turbine shell and the primary component, wherein the turbine shell is connected to the primary component via the intermediary element so as to define a first coupling section for coupling with the turbine shell and a second coupling section for coupling with the primary component, the first and second coupling sections being disposed offset relative to each other in an axial and a radial direction, wherein the first coupling section is disposed at a larger diameter than the second coupling section in the radial direction.

2. The force transmission device as recited in claim 1 wherein the intermediary element has a substantially constant wall thickness between the first and second coupling sections.

3. The force transmission device as recited in claim 1 wherein the intermediary element is a formed sheet metal part.

4. The force transmission device as recited in claim 1 wherein the intermediary element is plastic or a fiber composite material.

5. The force transmission device as recited in claim 1 wherein the intermediary element has a S- or Z- shape cross sectional profile.

6. The force transmission device as recited in claim 1 wherein the intermediary element includes joining surfaces at the first and second coupling sections, the joining surfaces being flange surfaces disposed parallel to each other.

7. The force transmission device as recited in claim 1 wherein the intermediary element includes joining surfaces provided as flange surfaces at the first and second coupling sections, the flange surfaces being disposed at an angle relative to each other.

8. The force transmission device as recited in claim 1 wherein the intermediary element includes joining surfaces provided as flange surfaces at the first and second coupling sections, the flange surfaces being orthogonal to each other.

9. The force transmission device as recited in claim 1 wherein the first coupling section has a flange surface and a complementary flange surface is formed at the turbine shell through a circumferentially extending collar disposed in the inner radial section of the turbine shell.

10. The force transmission device as recited in claim 1 wherein the first coupling section has a flange surface and a complementary flange surface in the first coupling section is formed at the turbine shell by a partial surface at an outer circumference of the turbine shell.

11. The force transmission device as recited in claim 1 wherein at least one connection between the first and/or second coupling section and the turbine shell or the primary component coupled at least indirectly torque proof with the output is a continuous material connection.

12. The force transmission device as recited in claim 1 wherein at least one connection between the first and second coupling section and the turbine shell or the primary component coupled at least indirectly torque proof with the output is provided a friction locked connection.

13. The force transmission device as recited in claim 1 wherein at least one connection between the first and second coupling section and the turbine shell or the primary component coupled at least indirectly torque proof with the output is provided a form locked connection.

14. The force transmission device as recited in claim 1 further comprising a device-for circumventing a hydrodynamic power flow, having a friction assembly including a first and a second friction surface array operably engageable through an actuation device.

* * * * *